(No Model.)

W. BAGULEY.
PIPE STOPPER.

No. 428,364. Patented May 20, 1890.

WITNESSES:
John M. Deemer
C. Sedgwick

INVENTOR:
W. Baguley
BY Munn & Co.
ATTORNEYS

UNITED STATES PATENT OFFICE.

WILLIAM BAGULEY, OF NEW YORK, N. Y.

PIPE-STOPPER.

SPECIFICATION forming part of Letters Patent No. 428,364, dated May 20, 1890.

Application filed March 18, 1890. Serial No. 344,316. (No model.)

*To all whom it may concern:*

Be it known that I, WILLIAM BAGULEY, of the city of New York, in the county and State of New York, have invented a new and useful Pipe-Stopper, of which the following is a full, clear, and exact description.

My invention relates more particularly to stoppers used in testing waste-pipes to detect flaws through which sewer and other gases would escape, and has for its object to provide a stopper that will be simple, durable, and easy of application to the ends of pipes.

The invention consists in the construction and combination of parts, as will be hereinafter fully described and claimed.

Reference is to be had to the accompanying drawings, forming a part of this specification, in which similar letters of reference indicate corresponding parts in all the views.

Figure 1:
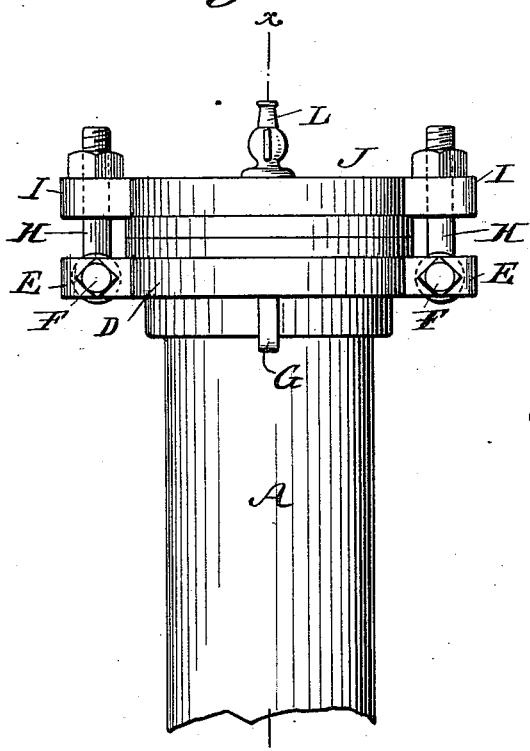
Figure 2:
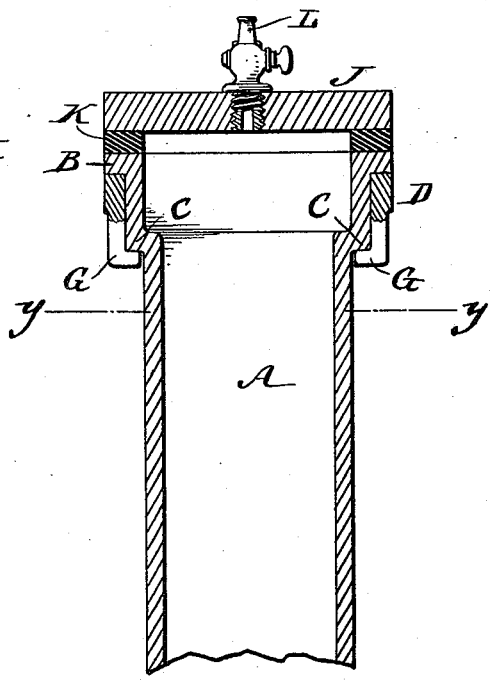
Figure 3:
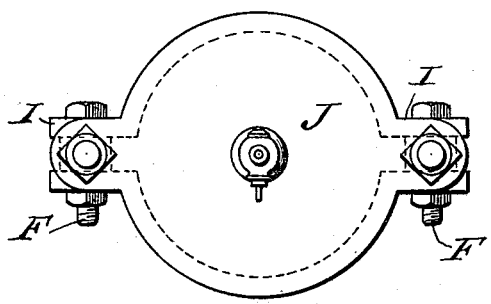
Figure 4:
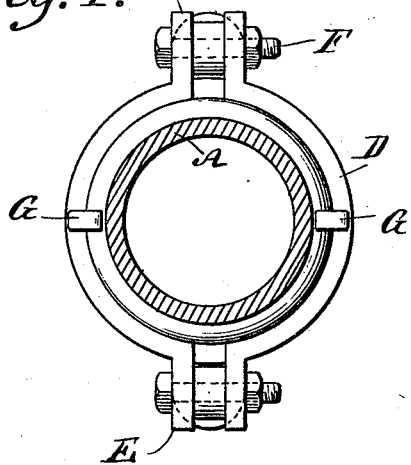

Figure 1 is a side elevation of a section of pipe with my improved stopper applied thereto. Fig. 2 is a section on the line $x\ x$ of Fig. 1. Fig. 3 is a plan view, and Fig. 4 is a cross-section on the line $y\ y$ of Fig. 2.

In the drawings, A represents a section of waste-pipe, having an end flange B, and just below a swell forming the shoulder C.

Encircling the swell and bearing against the flange B is a split collar D, which is made in halves with end lugs E, through which pass the connecting-bolts F.

G are clamp-hooks made integral with the collar D or riveted thereto and adapted to engage the shoulder C to give an additional hold to the collar, as well as to distribute the strain when the parts are in position.

Eyebolts H swing freely on the bolts F between the lugs E, and when in position project upward to pass through apertures in the lugs I of the head-plate J. Said head-plate is made circular with a diameter to correspond with that of the flange B, and the lugs I thereon are adapted to align with the lugs E of the collar D. The threaded ends of the bolts H are provided with nuts to draw the head-plate to place.

K is a packing or gasket of rubber or other suitable material interposed between the head-plate J and the flange B of pipe A.

L is a valve to admit the testing-fluid.

In preparing for the test the collar D is placed in position and the nuts on the bolts F screwed up sufficiently to hold the bolts H upright. The head-plate J is then placed on the pipe end with packing interposed and all the nuts screwed up to give the desired pressure to seal the opening of pipe.

Owing to the particular arrangement of my stopper, any irregularities in the face of flange of pipe may be overcome without danger of breakage, as the pressure is directly applied to the edge of the head-plate and an even strain given to the several parts.

Having thus described my invention, I claim as new and desire to secure by Letters Patent—

1. A pipe-stopper consisting of a split collar provided with apertured lugs, bolts engaging said lugs, eyebolts held on said bolts, and a head-plate having apertured lugs to receive said eyebolts, substantially as described.

2. In a pipe-stopper, the combination, with the divided collar D, provided with clamp-hooks G and lugs E, the bolts F, supporting the locking-bolts H, and the head-plate J, having fluid-inlet cock L, substantially as shown and described.

WILLIAM BAGULEY.

Witnesses:
BENJAMIN HOLSKE,
C. SEDGWICK.